US011184601B2

(12) United States Patent
Gu

(10) Patent No.: US 11,184,601 B2
(45) Date of Patent: Nov. 23, 2021

(54) APPARATUS AND METHOD FOR DISPLAY ENCODING

(71) Applicant: Shenzhen Yunyinggu Technology Co., Ltd., Shenzhen (CN)

(72) Inventor: Jing Gu, Shenzhen (CN)

(73) Assignee: SHENZHEN YUNYINGGU TECHNOLOGY CO., LTD., Shenzhen (CN)

( * ) Notice: Subject to any disclaimer, the term of this patent is extended or adjusted under 35 U.S.C. 154(b) by 5 days.

(21) Appl. No.: 16/721,818

(22) Filed: Dec. 19, 2019

(65) Prior Publication Data

US 2021/0195160 A1  Jun. 24, 2021

(51) Int. Cl.
| G02B 27/14 | (2006.01) |
| H04N 13/161 | (2018.01) |
| H04L 9/08 | (2006.01) |
| H04N 13/194 | (2018.01) |
| G06F 21/84 | (2013.01) |

(52) U.S. Cl.
CPC ........... *H04N 13/161* (2018.05); *G06F 21/84* (2013.01); *H04L 9/0822* (2013.01); *H04N 13/194* (2018.05)

(58) Field of Classification Search
CPC .... H04N 13/161; H04N 13/194; G06F 21/84; H04L 9/0822
See application file for complete search history.

(56) References Cited

U.S. PATENT DOCUMENTS

| 8,179,604 | B1 * | 5/2012 | Prada Gomez .... G02B 27/0093 359/630 |
| 2014/0362110 | A1 * | 12/2014 | Stafford .................. G06F 3/011 345/633 |
| 2014/0364208 | A1 * | 12/2014 | Perry ........................ G06F 3/14 463/31 |
| 2016/0370970 | A1 * | 12/2016 | Chu ........................ G06F 3/011 |
| 2017/0155885 | A1 * | 6/2017 | Selstad .................... G06T 3/00 |
| 2017/0324951 | A1 * | 11/2017 | Raveendran ....... G02B 27/0093 |
| 2017/0359456 | A1 * | 12/2017 | Shrubsole ......... H04M 1/72412 |
| 2018/0095542 | A1 * | 4/2018 | Mallinson ............... G06F 1/163 |
| 2018/0097975 | A1 * | 4/2018 | Osman ................. H04N 13/106 |
| 2018/0286053 | A1 * | 10/2018 | Labbe .................. H04N 19/597 |
| 2018/0295282 | A1 * | 10/2018 | Boyce ................ H04N 21/4728 |
| 2019/0035363 | A1 * | 1/2019 | Schluessler ............. G06T 15/20 |
| 2019/0295455 | A1 * | 9/2019 | Goodson .......... H04N 21/64322 |
| 2019/0341004 | A1 * | 11/2019 | Satpute .................... G06F 3/147 |
| 2020/0382664 | A1 * | 12/2020 | Morihira ............ H04N 1/00511 |
| 2021/0295599 | A1 * | 9/2021 | Adkinson ............... G06T 17/20 |

* cited by examiner

*Primary Examiner* — Howard D Brown, Jr.
(74) *Attorney, Agent, or Firm* — Bayes PLLC

(57) ABSTRACT

An apparatus can be provided for display glasses with securely displayed data. The apparatus can include a receiver configured to receive a signal containing formatted encoded display data and to extract encoded display data from the signal. The apparatus can include a decoder configured to decode the encoded display data to provide display data. The apparatus can further include a display configured to display the display data. The display can include glasses and the decoder can be configured to decode the encoded display data when the glasses are authorized to receive display data from a remote device.

20 Claims, 5 Drawing Sheets

APPARATUS AND METHOD FOR DISPLAY ENCODING

BACKGROUND

The disclosure relates generally to display technologies, and more particularly, to display encoding.

Wearable electronic glasses provide enhancements to users' lives in a variety of ways. These enhancements may improve user experience in a wide range of applications, from factory floor usage by workers on a parts assembly project to gaming and other recreational activities. Numerous other applications of wearable electronic glasses are possible.

SUMMARY

The disclosure relates generally to display technologies, and more particularly, to display encoding in display glasses.

An apparatus, according to certain embodiments, can include a receiver configured to receive a signal containing formatted encoded display data and to extract encoded display data from the signal. The apparatus can also include a decoder configured to decode the encoded display data to provide display data. The apparatus can further include a display configured to display the display data. The display can include glasses and the decoder can be configured to decode the encoded display data when the glasses are authorized to receive display data from a remote device.

In certain embodiments, an apparatus can include a processor configured to generate display data. The apparatus can also include an encoder configured to encode the display data thereby producing encoded display data. The apparatus can further include a transmitter configured to format the encoded display data for transmission as formatted encoded display data. The formatted encoded display data can be configured to be received, decoded, and displayed at a display remote from the apparatus.

A method can, according to certain embodiments, include receiving, by a receiver of display glasses, a signal containing formatted encoded display data. The method can also include extracting, by the receiver, encoded display data from the signal. The method can further include decoding, by a decoder of the display glasses, the encoded display data to provide display data when the glasses are authorized to receive display data from a remote device. The method can additionally include displaying, on a display of the display glasses, the display data.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
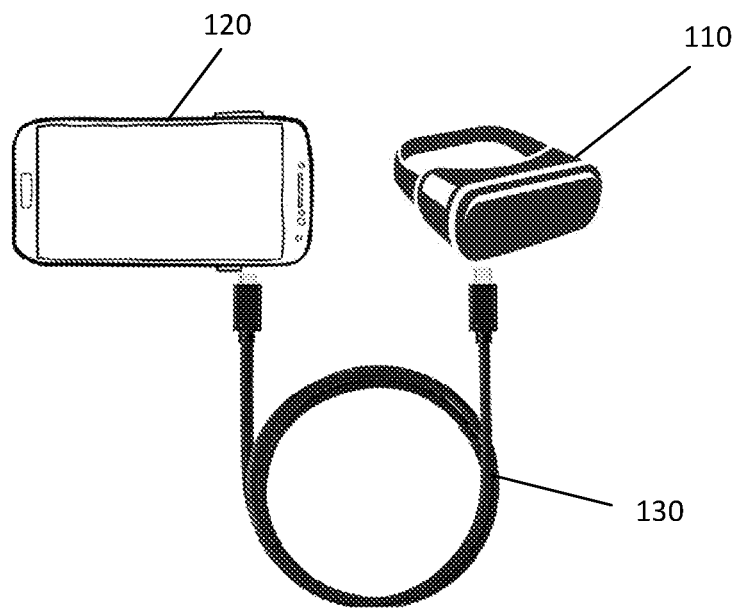
FIG. 1 illustrates an example of hardware consistent with certain embodiments of the present disclosure.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, the display system and method thereof disclosed herein may provide the ability to enhance the security of the display system. Security enhancements according to certain embodiments of the present disclosure may benefit wired and wireless displays. For example, certain embodiments may benefit wearable electronic glasses that are connected to a smart phone or other devices.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

Wearable electronic glasses can fall into a variety of categories. A first category of wearable electronic glasses is simple display glasses. Simple display glasses can provide a two-dimensional or three-dimensional image. Simple display glasses may not take into account user motion, but simply display a still image or video image. Simple display glasses can have varying levels of hardware.

A second category of wearable electronic glasses is virtual reality (VR) glasses. VR glasses may take into account the position and orientation of a user's head in the display process. Thus, for example, VR glasses may display a particular portion of a still panoramic image depending on the angle of the user's head. VR glasses can also be used in connection with three-dimensional (3D) images or videos to create a realistic and immersive user experience.

A third category of wearable electronic glasses is augmented reality (AR) glasses. AR glasses may combine live images of reality with computer-based enhancements. For example, the user may see a live video image of their current field of view (FOV) with additional data superimposed over the image.

The same hardware device may be configured in a variety of ways. For example, glasses with a built-in camera and posture and/or motion detection may function as simple display glasses in one application, as VR glasses in another application, and as AR glasses in yet another application. Accordingly, it may be imprecise to speak of a particular hardware device exclusively as simple display, VR, or AR.

In certain cases, the motion detection may be distributed away from the glasses themselves. For example, an associated device may observe the glasses using one or more cameras and may detect motion based on the analysis of captured images.

Other categories of wearable electronic glasses also exist. For example, wearable electronic glasses can be designed to be used by one eye or two eyes. Additionally, wearable electronic glasses may be self-contained or may operate in connection with another device. Connected operation may permit some of the processing to be handled by another device, which may reduce the processing requirements on the wearable electronic glasses.

Connected operation wearable electronic glasses can be further sub-divided into wired and wireless wearable electronic glasses, or wired-mode and wireless-mode, for wearable electronic glasses that are capable of both modes. The use of a wireless connection may have value, particularly when the wearable electronic glasses are connected to a smart phone or similar portable device.

FIG. 1 illustrates an embodiment according to the present disclosure. As shown in FIG. 1, a system can include display glasses 110 connected to a smart phone 120 by a cable 130. The smart phone 120 is an example of any desired device, such as any portable electronic device. The cable 130 can be provided with suitable connectors. For example, universal serial bus (USB) type C connectors may be used, although other connector types may be used in other applications. The display glasses 110 can operate as virtual display glasses without requiring any internal CPU, control system, or even battery.

Figure 3:
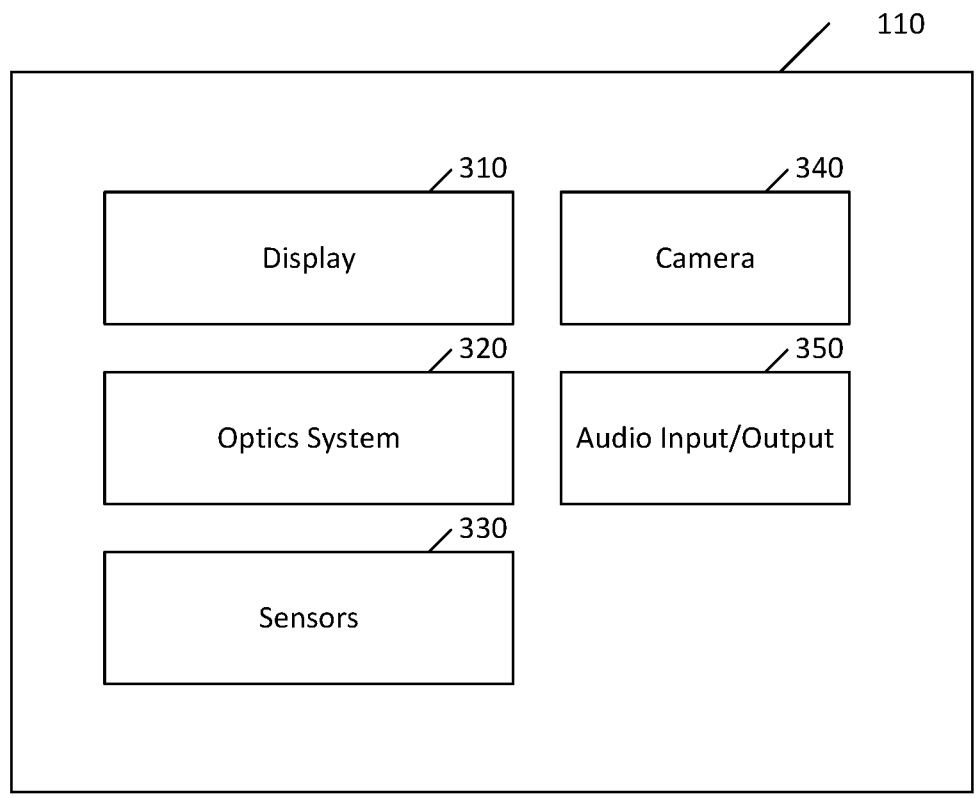
FIG. 3 illustrates a system according to certain embodiments of the present disclosure.

FIG. 3 illustrates an embodiment of display glasses consistent with certain embodiments of the present disclosure. As shown in FIG. 3, The display glasses 110 may include a display 310, such as a micro-OLED display. The display glasses 110 may also include an optics system 320, which may include a lens, such as a birdbath and/or freeform lens and a waveguide.

The display glasses 110 may also include sensors 330. The sensors 330 may be, for example, 6 DOF MEMS G-Sensors. The display glasses 110 may also a camera 340 and audio input/output 350, which may be a built-in earphone/microphone or a jack or other interface for external audio devices. Other audio options are also possible, such as one or more built-in speaker or wireless connection to wireless headphones or earbuds.

Figure 2:
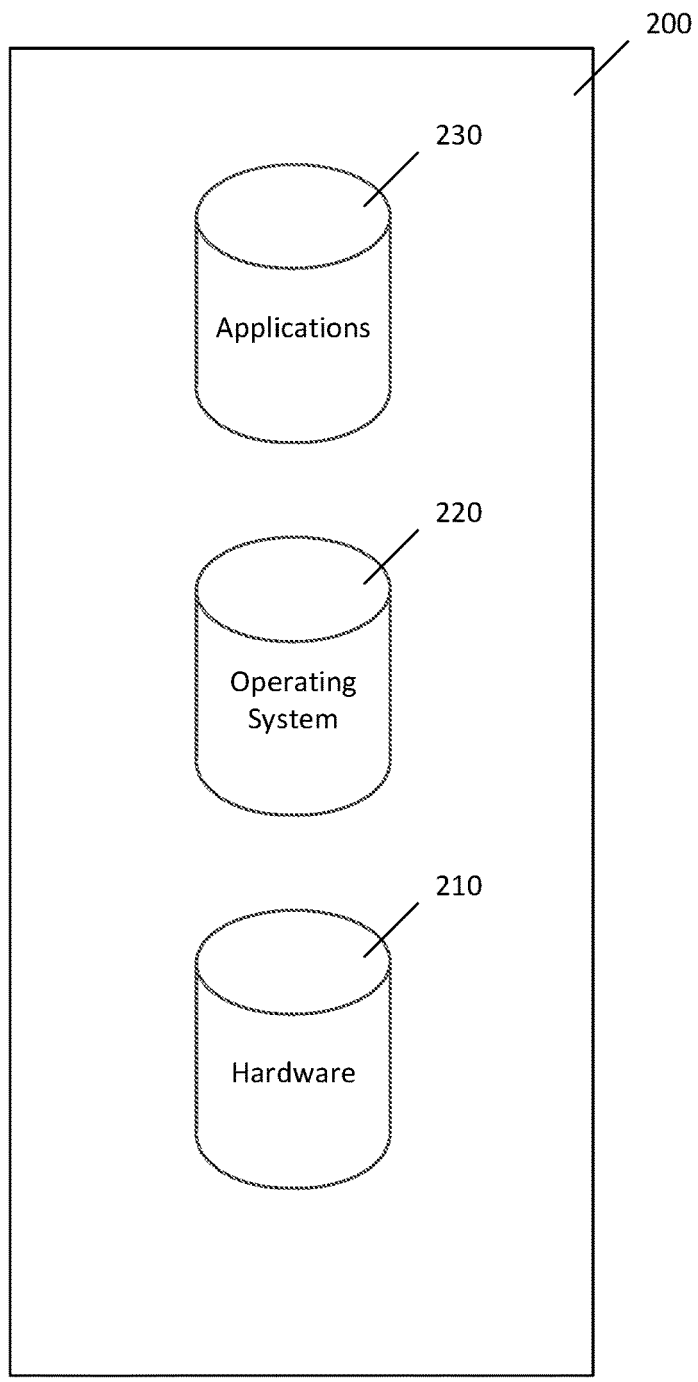
FIG. 2 illustrates an architecture of certain embodiments according to the present disclosure.

FIG. 2 illustrates an architecture of certain embodiments according to the present disclosure. As shown in FIG. 2, a system 200 for display glasses may involve multiple layers. At the conceptual bottom of the stack, there may be hardware 210, such as a monocular or binocular display, motion sensors, processors, and the like. This hardware 210 may be equipped with an operating system 220, which may permit the use of the hardware 210 in numerous ways. Applications 230 may form a conceptual top layer and may provide the specific ways in which the operating system 220 is used to control and access the hardware 210.

Display glasses may have numerous applications 230. For example, display glasses can be configured in hardware 210 with a wide field of view (FOV), such as fifty degrees or more. The display glasses connected to a smart phone may permit the user to use the smart phone's user interface features, in application 230 running on operating system 220, for adjustments to volume, dimming, and so on. For example, software installed on the smart phone may permit swiping, pinching, or other gestures on the touch interface to perform control actions for a movie being displayed on the display glass screen. In this example, hardware 210, operating systems 220, and applications 230 may be present both at the smart phone and also at the display glasses. Thus, system 200 is illustrated as a single box, but may span multiple devices.

Another application 230 may be gaming. In this context, the user interface of the smart phone may serve as a game controller. In a further application, the display glasses can be used for a virtual computer monitor array. In this example, the smart phone may serve as a CPU and the smartphone's user interface may serve as a touchpad or mouse. A wireless keyboard can be connected to the smart phone to provide a more extensive set of keys. As a further option, the smart phone's camera can be used to monitor the finger position of the user on an arbitrary surface, to thereby provide a virtual keyboard. Thus, additional hardware 210, such as peripherals, accessories, and the like, can also be provided.

Figure 4:
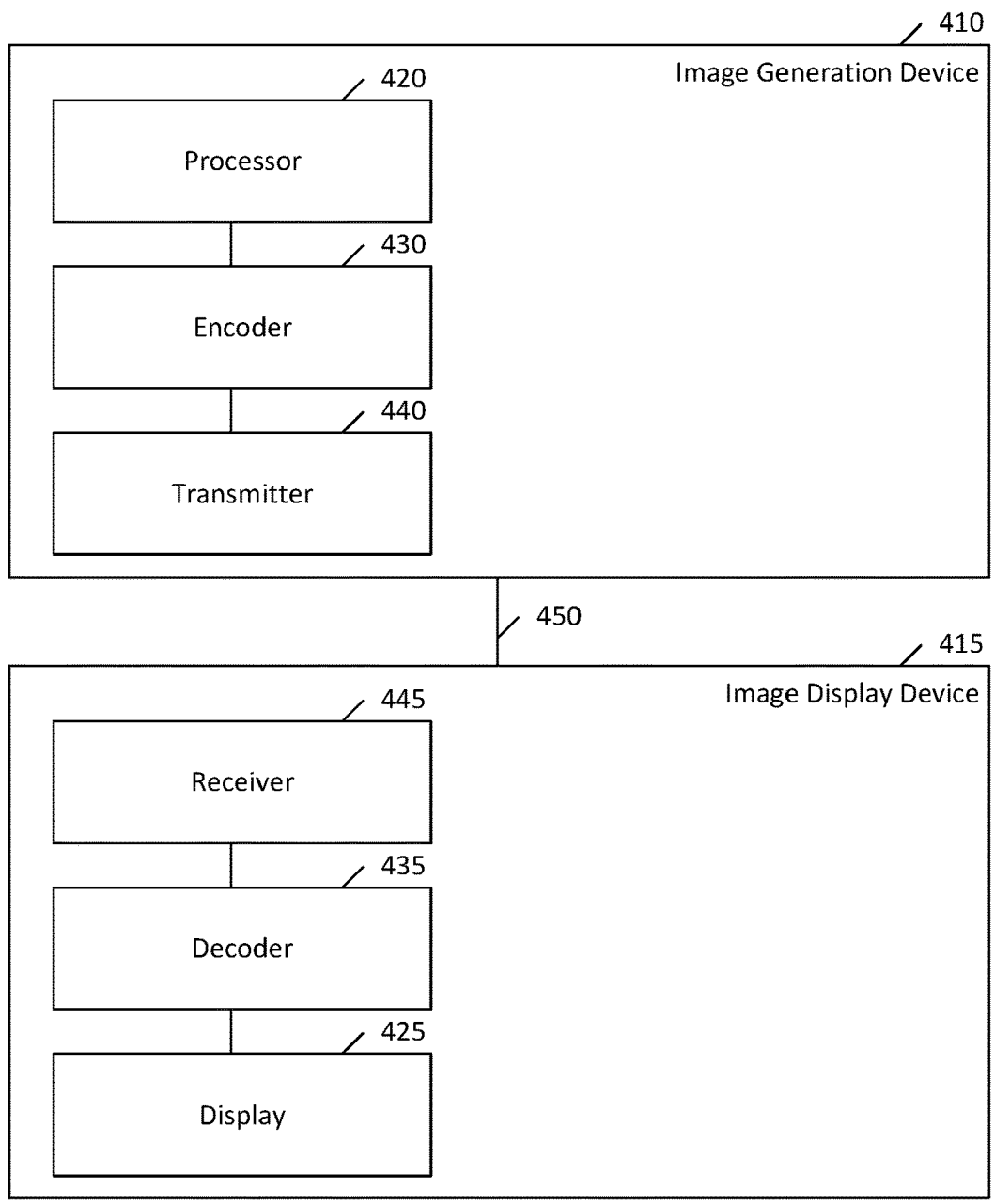
FIG. 4 illustrates a system according to certain embodiments.

FIG. 4 illustrates a system according to certain embodiments. As shown in FIG. 4, there can be an image generation device 410, such as a smart phone, and an image display device 415, such as display glasses.

The image generation device 410 may include a processor 420 configured to generate images. The processor 420 may, for example, be a CPU or graphics processing unit (GPU). The image generation device 410 may include multiple processors and processor 420 may include multiple cores. For example, in a binocular implementation, there may be one graphics processor, graphics processing core, or processing thread configured to generate left-eye images, and similarly another of the same configured to generate right eye images. The processor 420 may generate an image or video stream by combining multiple input streams from other sources. For example, combining can include combining left and right eye images, combining a video with overlaid data, or the like. Other options are also permitted.

The image generation device may also include an encoder 430 configured to secure the output of processor 420. Example embodiments of the encoder 430 are discussed below. The output of the encoder 430 may be provided to a transmitter 440. The transmitter 440 may be a wireless transmitter or a wired transmitter, including a port for a cabled connection, such as a universal serial bus (USB) connection or video graphics array (VGA) connection. Wireless transmitters may include relatively low power transmitters, such as those following Bluetooth standards, or higher power transmitters, including WiFi or broadcast television transmitters.

Transmitter 440 may provide the encoded signal (optionally further encoded for communications purposes) over connection 450 toward image display device 415. Although connection 450 is shown as a direct one-to-one connection, any other connection mechanism is permitted. For example, multi-cast or broadcast techniques may be used and the signal may be relayed using, for example, repeater stations.

Encoded data sent over connection 450 may be received at the image display device 415 and particularly by the receiver 445. The receiver 445 may be a standard receiver of the kind that corresponds to the transmission mechanism used by transmitter 440. The output of receiver 445 may be provided to decoder 435, which may remove the encoding and provide usable image and/or video data to display 425. The decoder 435 will be discussed in more detail below. The display 425 may be, for example, an OLED display, such as an AMOLED display.

The encoder 430 and decoder 435 may be variously embodied and configured. For example, the decoder 435 may be configured to decode using a key stored in memory (not illustrated) of the image display device 415. The image generation device 410 may be configured to control the encoder 430 to encode the data based on the key.

One way to implement this keyed approach is for the image display device 415 to have a permanent and unalterable key, which can be read in a human-readable form on an exterior surface of the image display device 415. A user can then input this key to the image generation device 410. Similarly, a printed QR code or bar code on the image display device 415 could be read by a camera of the image generation device 410. Other key exchange options are also possible, such as permitting the image display device 415 to transmit its own key wireless in response to a button press on the image display device 415 itself. In a further embodiment, the image display device 415 may be a wearable device that guides a wearer through a configuration sequence to calibrate motion sensor(s) of the image display device 415. The wearable device may signal its own key to the image generation device 410 upon the successful completion of the configuration sequence.

In another approach, the image generation device 410 may request access to the key and the wearer of the display glasses may provide access to the key through a responsive detectable gesture, such as nodding the wearer's head, blinking the wearer's eyes, or the like.

In another approach, the decryption key may be an acquired key. For example, display glasses may receive the key in response to payment, in response to entering a password, or in response to passing a biometric test. Other options are also possible. For example, a key fill port may be provided on the image display device 415 and the key may be temporarily loaded into memory from the key fill port.

Other options are also possible. For example, landmarks disposed on an exterior surface of the image display device 415 may be detected by a camera, for example, a front camera, of the image generation device 410. This detection may confirm that the image display device 415 is in the vicinity of the image generation device 410.

In certain embodiments, the key may be a time-varying pseudorandom code displayed on the image display device 415, for example at startup. Thus, for example, a wearer may be shown a key in the field of view of the display glasses and the wearer may enter that key into a smartphone to begin the encoded transmission of data. Similarly, the key may be presented in a machine-readable format on the display 425 and a camera of the image generation device 410 may be used to read the key.

Figure 5:
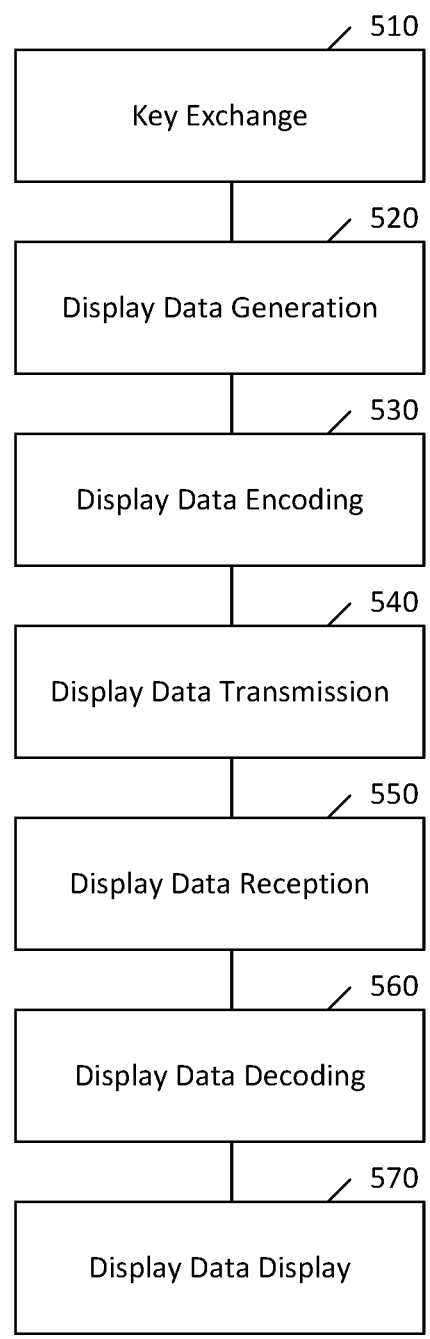
FIG. 5 illustrates a method according to certain embodiments.

FIG. 5 illustrates a method according to certain embodiments. The method of FIG. 5 may be performed by any of the above-described apparatuses or systems. As shown in FIG. 5, a method can include, at 510, a key exchange. A key exchange can be performed in a variety of ways. For example, a key may be printed on a label of the display glasses and may be input by the user or captured by a camera of an associated smart phone of the user. As another option, the key may be displayed on a screen of the display glasses. The user's eyes or a camera of the smart phone may be used to capture the key from the screen. Likewise, the key may be displayed on a screen of the smart phone and may be input into the display glasses, such as by use of a camera of the display glasses or by the motion of the display glasses. Other ways of doing the key exchange are also permitted. Other security/authentication measures can be substituted for a key exchange. In other embodiments, a public key/private key pair can be used and each device can rely on a trusted remote server for authentication.

As shown in FIG. 5, the method can also include display data generation 520. The display data can be generated independently of the key. Thus, for example, an image processor can generate data to be displayed without considering that the data may need subsequent encoding for the purpose of ensuring that the display data can only be displayed on authenticated display glasses.

The method can further include, at 530, display data encoding. The display data can be encoded based on the key or any other desired mechanism. The encoding can involve encrypting the display data so that a passcode, key, or other authenticating mechanism is needed to decode or decrypt the display data.

The method can additionally include, at 540, display data transmission. Display data transmission 540 may involve additional coding and modulation schemes for purposes of communication. These schemes may be applied at a different logical level of the communication stack, such that a suitable receiver may be able to receive the encoded display data at 550 without necessarily being able to decode the display data at 560. Nevertheless, the intended display glasses may be provided with a key or other suitable mechanism for performing the display data decoding 560 after the display data reception at 550. Accordingly, the display glasses may then display the display data at 570.

In certain embodiments, a first portion of display data may be sent without being encoded. This display data may prompt the key exchange at 510 or some other suitable security mechanism. As another option, a portion of a display may not be encoded, whereas a portion (for example a quadrant or half) of the display may be encoded. This approach may allow unauthenticated display glasses to view a mono image, while reserving a stereo image for authenticated display glasses.

The above detailed description of the disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. An apparatus, comprising:
   a receiver configured to receive a signal containing formatted encoded display data and uncoded display data and to extract encoded display data from the signal, the signal being generated, through a remote device remote from the apparatus, based on display data;
   a decoder configured to decode the encoded display data based on a key associated with the remote device to provide decoded display data; and
   a display comprising glasses,
   wherein:

the glasses are configured to display the decoded display data upon successful authentication of the glasses and to display only the uncoded display data upon unsuccessful authentication of the glasses.

2. The apparatus of claim 1, wherein the receiver comprises a wireless receiver.

3. The apparatus of claim 1, further comprising:
at least one motion sensor, wherein the decoder is configured to decode based on user input received via the at least one motion sensor.

4. The apparatus of claim 1, wherein the key includes a key pair system, and the decoder is configured to decrypt the encoded display data with a private key of the key pair system, wherein a portion of the display data was encrypted with a public key of the key pair system to generate the encoded display data.

5. The apparatus of claim 1, further comprising:
a label indicative of the key, wherein the key is configured to be used by an encoder to encrypt a portion of the display data.

6. The apparatus of claim 1, wherein the key includes a machine-readable key, and the display is configured to display the machine-readable key, wherein the key is used by an encoder to encode a portion of the display data.

7. The apparatus of claim 1, further comprising:
a key fill port, wherein the decoder is configured to decode the encoded display data based on the key received via the key fill port.

8. The apparatus of claim 1, further comprising:
a camera, wherein the key includes a machine-readable code, and the camera is configured to capture the machine-readable code on the remote device, wherein the decoder is configured to decode based on the captured machine-readable code.

9. An apparatus, comprising:
a processor configured to generate display data;
an encoder configured to encode a portion of the display data based on a key, thereby producing encoded display data, another portion of the display data including uncoded display data; and
a transmitter configured to format the encoded display data as formatted encoded display data and to transmit the formatted encoded display data and the uncoded display data,
wherein:
the formatted encoded display data and the uncoded display data are configured to be received at a remote device remote from the apparatus, and the formatted encoded display data is decoded according to the key to provide decoded display data, and
the decoded display data is displayed at the remote device upon successful authentication of the remote device, and only the uncoded display data is displayed at the remote device upon unsuccessful authentication of the remote device.

10. The apparatus of claim 9, wherein the transmitter comprises a wireless transmitter.

11. The apparatus of claim 9, wherein the encoder is configured to secure the encoded display data from unintended recipients.

12. The apparatus of claim 9, wherein the key includes a key pair system, and the encoder is configured to encrypt the portion of the display data with a public key of the key pair system to be decryptable by a private key of the key pair system.

13. The apparatus of claim 9, further comprising:
a user interface configured to receive the key from a user of the apparatus, wherein the key is used by the encoder to encode the display data.

14. The apparatus of claim 9, further comprising:
a camera configured to capture the key from the display, wherein the key is used by the encoder to encode the display data.

15. The apparatus of claim 9, further comprising:
a display configured to provide the key, wherein the encoded display data is decodable based on the key provided by the display.

16. A method, comprising:
receiving, by a receiver of display glasses, a signal containing formatted encoded display data and uncoded display data, the signal being generated, through a remote device remote from the display glasses, based on display data;
extracting, by the receiver, encoded display data from the signal;
decoding, by a decoder of the display glasses, the encoded display data based on a key associated with the remote device to provide decoded display data; and
displaying, on a display of the display glasses, the decoded display data upon successful authentication of the display glasses and displaying, on the display of the display glasses, only the encoded display data upon unsuccessful authentication of the display glasses.

17. The method of claim 16, further comprising:
receiving user input via at least one motion sensor, wherein the decoding is based on the user input received via the at least one motion sensor.

18. The method of claim 16, wherein the key includes a key pair system, and the decoding comprises decrypting the encoded display data with a private key of the key pair system, wherein a portion of the display data was encrypted with a public key of the key pair system to generate the encoded display data.

19. The method of claim 16, wherein the key includes a machine-readable key, and the display glasses are configured to display the machine-readable key, wherein the key is used by an encoder to encode the display data.

20. The method of claim 16, further comprising:
receiving the key via a key fill port, wherein the decoding is based on the key received via the key fill port.

* * * * *